United States Patent [19]

Bueckner, Sr.

[11] 3,865,204
[45] Feb. 11, 1975

[54] PRIME MOVER FOR TRAILERS AND THE LIKE

[76] Inventor: John E. Bueckner, Sr., Houston, Tex. 77002

[22] Filed: Apr. 5, 1973

[21] Appl. No.: 348,122

[52] U.S. Cl............... 180/12, 180/14 R, 180/19 R, 192/51
[51] Int. Cl............................................ B62d 51/06
[58] Field of Search........ 180/12, 19 H, 19 R, 14 C, 180/14 R; 192/21, 51

[56] References Cited
UNITED STATES PATENTS

| | | | |
|---|---|---|---|
| 410,012 | 8/1889 | Otto | 192/21 |
| 1,519,164 | 12/1924 | Pfeiffer | 192/51 X |
| 2,368,202 | 1/1945 | Clark | 180/12 |
| 3,021,625 | 2/1962 | Stasse | 180/19 R |
| 3,051,013 | 8/1962 | Zagar | 192/21 |
| 3,179,196 | 4/1965 | Richardson | 180/14 R |
| 3,312,318 | 4/1967 | Ryan | 192/51 X |
| 3,370,666 | 2/1968 | Holtzclaw | 180/14 R |
| 3,570,316 | 3/1971 | Hornack | 192/51 X |

Primary Examiner—David Schonberg
Assistant Examiner—Terrance L. Siemens
Attorney, Agent, or Firm—Bard & Springs

[57] ABSTRACT

A hand-steered prime mover is provided for applying auxiliary power to towable vehicles such as house trailers, etc., whereby such vehicles may be more conveniently transported over relatively short distances and maneuvered about within restricted areas. The prime mover preferably omits provision for supporting and carrying its operator, and preferably includes only a pair of wheels on an axle located beneath the pivot point of connection between the trailer draw bar and the prime mover, and a simple but rugged clutch/transmission assembly composed of a driving cylinder with oppositely beveled ends for engaging one side or other of the beveled inner surface of a dish-like plate member rotatably connected through a suitable gear train to the wheels and axle of the prime mover.

10 Claims, 6 Drawing Figures

3,865,204

PRIME MOVER FOR TRAILERS AND THE LIKE

BACKGROUND OF INVENTION

This invention relates to prime movers for towable vehicles and the like and, more particularly, relates to prime movers of relatively smaller size and capability for maneuvering or relocating towable vehicles within relatively small areas.

It is conventional to interconnect a prime mover with a towable vehicle by a pivot-type linking means such as a ball and socket connection. Thus, the towed vehicle can be easily drawn in a forward direction over roads and highways having relatively acute turning points. If the assembly must be moved backward, however, this creates immediate problems for all but the most experienced operators, since the towed vehicle tends to move in a different direction from that of its prime mover due to the hinge-like nature of the arrangement. If the task is to relocate the towed vehicle within a restricted area, or if there are obstacles in the area which must be avoided, the task often becomes formidable.

An experienced over-the-road truck driver can maneuver a large trailer-tractor combination within a relatively small area with deceptive ease. However, the average person often finds it quite difficult if not impossible to use his automobile or truck to maneuver a relatively small house or boat trailer about a small area. For this reason, it is common practice for many such persons to manhandle boat trailers about, and often even house trailers, in order to shift them into a desired location or position.

It is obviously dangerous for even a healthy vigorous man in the prime of his life to attempt to move a boat or house trailer by hand, and for a woman, or a man who is either not well or past his prime, such a feat is usually impossible. Accordingly, there has long been a need for a small and relatively inexpensive prime mover which the average person can use to perform a task of this type.

Many attempts have been made to supply suitable devices, as may be seen by the prime movers depicted in U.S. Pat. Nos. 2,649,162, 2,851,179, 3,179,196, 3,370,666 and 3,439,764 and others. For various reasons, however, none of these and other such prime movers has proved to be wholly satisfactory for these purposes.

It is obviously a requirement that any prime mover sought to be used for this purpose must be capable of developing adequate power to move whatever vehicle is intended to be relocated. What is also necessary, however, is that such a prime mover must itself be relatively light in weight and sufficiently portable that it can be lifted and stowed away in the house trailer or the like by a woman or elderly man of ordinary strength. Such a device cannot, therefore, be much larger or heavier than the average gas-powered lawn mower. On the other hand, many of the devices of the prior art are quite heavy and bulky and are quite difficult for an exceptionally vigorous man to lift and stow in the house trailer sought to be moved.

A prime mover of this type is clearly a piece of auxiliary equipment which will be used only relatively infrequently by a private owner of a house trailer or the like. Accordingly, it is essential to the suitability of such a device that it be relatively inexpensive. However, many such devices of the prior art are quite elaborate and expensive and are therefore completely unsuitable for the average user to which the present invention is directed. In addition, an elaborate prime mover is almost always difficult and expensive to repair and maintain, which is also a limitation to its suitability for these purposes.

Finally, it would seem obvious that it is essential that a prime mover intended for these purposes should be easy for an unskilled person to maneuver, and that it should be capable of being maneuvered without itself creating any limitation on the range of vision of its operator. Many of the prime movers of the prior art, on the other hand, are themselves difficult to maneuver about in close quarters. In addition, those designed to be ridden by the operator necessarily restrict his range of vision insofar as the trailer is concerned, since they require that the operator remain seated in one location while the prime mover is being used.

These and other limitations and disadvantages of the prior art are overcome by the present invention, and novel and improved apparatus is herewith provided which is especially suitable for use by a person of only limited skill and capacity to easily maneuver relatively large vehicles and other rolling stock about within a restricted location.

SUMMARY OF INVENTION

An ideal embodiment of the present invention may be a prime mover having a pair of wheels mounted suitably on a conventional axle, a gasoline-powered engine of conventional design and suitable capability, speed reduction means interconnected with the axle and composed of a conventional gear train, as hereinafter described, and a suitable clutch of particular design for appropriately coupling power from the engine to the gear train. The entire assembly is mounted in, and supported by, an appropriate chassis preferably having a tiller or other means at one end and adjacent the engine, whereby the prime mover may be conveniently steered and controlled. Hence, the axle and wheels are preferably located adjacent the opposite end of the chassis to facilitate steering, as will hereinafter be explained in detail.

The chassis preferably also has provision, such as a cup-like receptacle mounted on its upper portion, and preferably above the axle, for receiving and supporting the lower end of the jack bar which is found threadably inserted vertically through the outer end of the trailer draw bar. Accordingly, when the end of the chassis having the axle and wheels is positioned under the trailer draw bar, and when the lower end of the trailer jack bar is positioned in the cup-like receptacle on the top of the chassis, it will be noted that the prime mover may be horizontally rotated either clockwise or counter-clockwise beneath the trailer draw bar. Further, if the wheels of the prime mover are not too large, the prime mover may be pivoted beneath the draw bar through a maximum angle of rotation in either direction, and maneuverability of the prime mover, and therefore of the trailer, will be greatly enhanced.

It should be noted that, although it is desirable that the prime mover have wheels of a limited size, it is frequently required that the prime mover be used in relatively uneven terrain. Moreover, the condition of the terrain may be soft and yielding, whereby the weight of the trailer on the prime mover may tend to cause the prime mover to become mired to the point where it cannot be easily moved. Accordingly, it is preferable for these purposes to provide the wheels of the prime mover with low-pressure pneumatic tires or the like, whereby the wheels can more conveniently move through terrain of such character.

Since the purpose of the prime mover is to provide means whereby the trailer is to be maneuvered about in various directions, it is desirable that the clutch assembly be capable of applying rotary power from the engine in such a manner that the prime mover may be moved backwards as easily and at the same speed as it may be moved forward. In addition, since operators of this type of prime mover walk behind it as they steer it, it is desirable that the clutch be designed whereby it may be operated with one hand at the same time the tiller or steering bar of the prime mover is manipulated with the other hand of the operator. Further, it is not convenient with a primer mover of this type for the operator to be required to vary the speed of the engine, and thus it is desirable that the clutch be capable of transmitting more or less driving energy to the gear train, in order that the prime mover be driven at the desired speed.

In the ideal embodiment of the present invention, these requirements are met by a clutch assembly composed of a rotatable cylinder-like body having frusto-conical ends and coaxially mounted on the end of the drive shaft of the engine, and a circular dish-like member revolvably driving a sprocket chain or the like which, in turn, rotates the first gear in the gear train. The dish-like member is concentrically and rotatably mounted on a lever bar or the like having its opposite end pivotally attached to the chassis, and with its concave surface adjacent and confronting the cylindrical body being revolved by the drive shaft of the engine. When the lever bar is positioned vertically relative to the chassis of the prime mover, the dish-like member is of a size that it is too large in diameter for its concave surface to contact the bevelled surface of either of the two frusto-conical ends of the revolving cylindrical body, whereupon driving power is not being applied to the gear train and axle. On the other hand, if the lever bar is tilted in either direction alongside the revolving cylindrical member, whereby one or the other of its two conical ends will rotatably engage the concave surface of the dish-like member, this will rotate the dish-like member in a direction determined by which conical end is so engaged. Engagement of a conical end will, of course, transmit driving energy to the gear train. Furthermore, the dish-like member will rotate at a speed depending upon how firmly it is brought into contact with the end of the cylindrical member, and thus the lever bar may be employed by the operator to control the speed, as well as the direction of travel, of the prime mover.

It will be apparent that, in contrast to a truck or tractor or the like, a prime mover of the type embodied in the present invention is an auxiliary source of motive power intended primarily, if not only, for transporting a towed vehicle over only relatively short distances. However, this is because such a device will preferably have a top operating speed not exceeding the walking speed of its operator, and not because of any other limitation in its design. Furthermore, although primarily designed to be used by private owners of house trailers and the like, it will readily be apparent to those with experience in this art that a prime mover of this type and design can easily move rolling stock of far greater size and weight than a house trailer, and that it is extremely useful for moving large trailer vans, etc.

Since a prime mover of the type embodying the present invention is relatively simple in design and, in contrast with much of the prior art, has only two wheels and no provision for carrying its operator, it will be apparent that the device can be made much lighter and cheaper without any sacrifice of its ability to move a load. Accordingly, not only is the cost of this prime mover nearer the purchasing capacity of the average owner of a house trailer, but it is also light enough to be easily lifted and carried short distances by a person of average strength and vigor.

Accordingly, these and other features and advantages of the present invention will become apparent from the following detailed description, wherein reference is made to the figures in the accompanying drawings.

IN THE DRAWINGS

DETAILED DESCRIPTION

Figure 1:
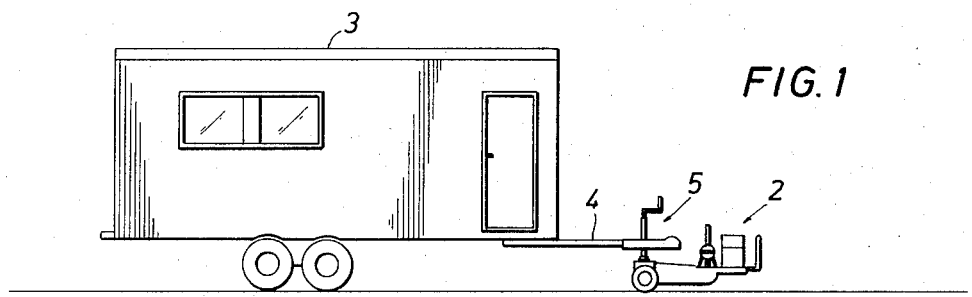
FIG. 1 is a simplified pictorial representation exemplifying how one embodiment of the present invention may be interconnected with a towable vehicle such as a house trailer of conventional design.

Referring now to FIG. 1, there may be seen a simplified pictorial representation of one embodiment of the present invention being employed in its intended manner. In particular, there is depicted a towable vehicle such as a house trailer 3 of conventional design which is provided with a suitable draw bar 4 and a two-wheeled prime mover 2 coupled to the draw bar 4. It is well known, of course, that a house trailer 3 of this type is designed to be positioned in a horizontal manner when in use, and thus the draw bar 4 is conventionally provided with supporting means such as a screw-type jack assembly 5. As will be clear from the explanation hereinafter provided, the lower end of the jack assembly 5 is rested on an appropriate point on the prime mover 2, whereby the house trailer 3 is supported by its own wheels at one point along its length and by the prime mover 2 at a pivot point. Since the prime mover 2 itself rests on only two closely spaced apart wheels located on each side of the pivot point, it will be apparent that the prime mover 2 can be rotated pivotally under the draw bar 4 to maneuver the house trailer 3 within much closer limits than is possible with an automobile or other means having a larger turning radius.

Figure 2:
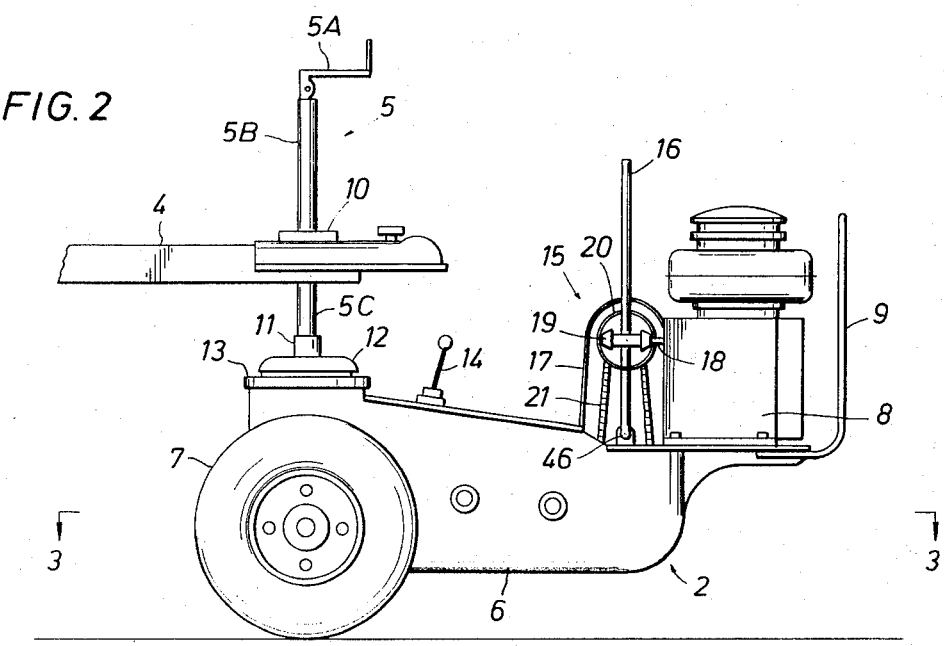
FIG. 2 is a larger and more detailed pictorial representation of the prime mover depicted in FIG. 1.

Referring now to FIG. 2, there may be seen a more detailed pictorial representation of the prime mover 2 depicted generally in FIG. 1, and also the draw bar 4 to which it is attached. More particularly, the prime mover 2 may be seen to be composed of a chassis 6 of a design suitable for containing a gear train (not depicted in FIG. 2) and also suitable for supporting a pair of wheels 7 at one end and a conventional gasoline-driven engine 8 at the other end. The chassis 6 will preferably have a table portion 13 located between and immediately above the wheels 7 and a steering bar 9 or the like on the end of the chassis 6 adjacent the engine 8.

Referring now to the draw bar 4 depicted in FIG. 2, it should be noted that this component of the trailer 3 may be of any conventional design. As hereinbefore suggested, however, most such devices will be provided with a jack assembly 5 which may be composed principally of a screw bar 5B or the like threadedly and rotatably inserted vertically through a suitable nut or jack plate 10 fixed in or on the draw bar 4, and having a wheel or crank handle 5A attached to its upper end. The lower end 5C of the screw bar 5B is normally provided with a caster (not depicted) or the like, but for present purposes the caster is preferably removed, and the lower end 5C of the screw bar 5B is insertably positioned in an appropriate socket 11 or other receptacle fixedly and centrally mounted on circular supporting assembly 12 which is rotatable on the table portion 13 of the chassis 6. Thus, the prime mover 2 may be rotated independently of the socket 11, thereby preventing damage to the end 5C of the screw bar 5B.

Referring again to FIG. 1, it will be noted that the prime mover 2 further includes a suitable clutch assembly 15 whereby power from the engine 8 may be appropriately transmitted from the engine 8 to the wheels 7 by way of suitable linkage such as an endless belt or sprocket chain 21 coupled to the gear train (not depicted in FIG. 2) in the chassis 6 and preferably covered by a protective housing or shield 17.

Figure 3:
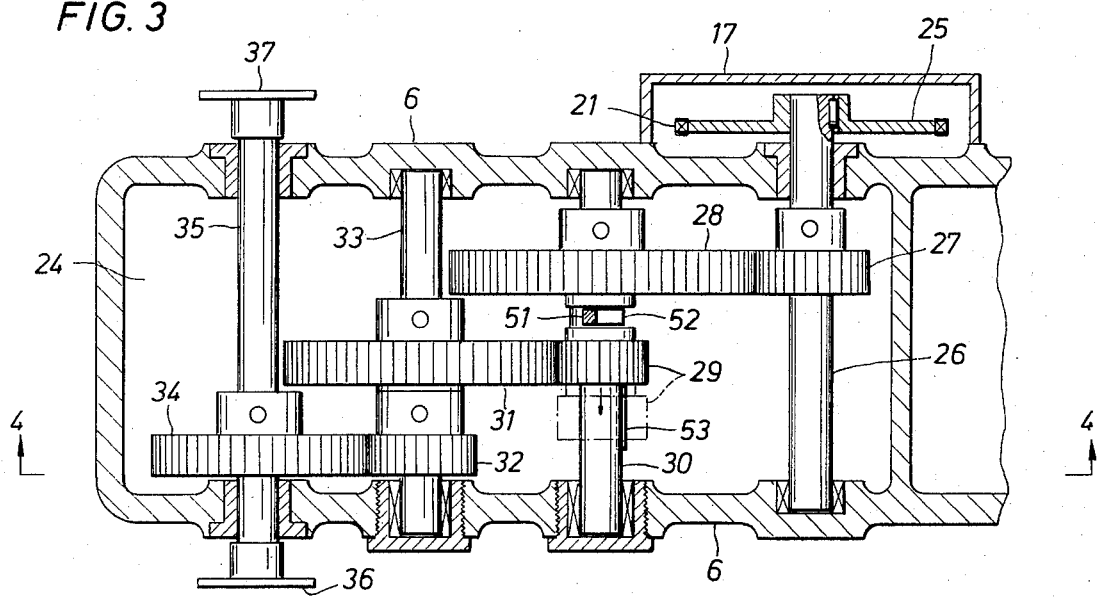
FIG. 3 is a pictorial representation, partly in cross section, of a portion of the apparatus depicted in FIG. 2.

Referring now to FIG. 3, there may be seen a top view of the internal configuration of the chassis 6 depicted pictorially in FIG. 2, and of the gear train contained therein and immersed at least partially in a bath of oil or other lubricant 24. More particularly, the sprocket chain 21, which is coupled at its upper end to the clutch assembly 15 depicted in FIG. 2, is also coupled at its lower end to suitable driving means such as a sprocket wheel 25 fixed on one end of a first gear shaft 26. Accordingly, rotation of the shaft 26 by the sprocket chain 21 and wheel 25 causes rotation of a first spur-type driving gear 27 mounted on the shaft 26.

The first driving gear 27 is enmeshed with a first driven gear 28, which is fixed on a second rotatable gear shaft 30. Rotation of the second gear shaft 30 therefore rotates a second driving gear 29 also mounted thereon and normally enmeshed with a second driven gear 31 which, in turn, is fixedly mounted on a third rotatable shaft 33. Rotation of the third shaft 33, in turn, rotates a third driving gear 32 which, in turn, is enmeshed with a third driven gear 34 fixedly mounted on an axle 35 having mountings 36 and 37 at each end for supporting the wheels 7 represented generally in FIGS. 1 and 2.

The relative sizes of the various gears depicted in FIG. 3 will depend, of course, on the speed ratio sought to be provided. It will also be apparent that the shafts may be revolved in either direction. Accordingly, whether the prime mover 2 is propelled forward or backward depends on whether the clutch assembly 15 rotates the sprocket chain 17 in one direction or the other.

As will hereinafter be explained, the clutch assembly 15 can be positioned to disconnect as well as to connect either forward or backward driving power to the first gear shaft 26. Thus, the prime mover 2 can be immobilized or pivoted about under the draw bar 4 of the trailer 3 without the inconvenience of turning off the engine 8. If the axle 35 is rotated at any time while the various gears in the chassis 6 are engaged as hereinbefore explained, however, this will necessarily transmit rotation to each gear shaft in the assembly and to the sprocket chain 21 connecting the gear train to the clutch assembly 15. It is often desirable to manually drag the prime mover 2 along the ground from one location to another, and this will be a relatively easy task if the wheels 7 can turn freely. If rotation of the wheels 7 necessarily rotates all the components in the gear train, however, then the wheels 7 will actually tend to brake against such rotation unless means is included whereby the wheels 7 may be wholly or partly disconnected from the gear train. This disadvantage may be substantially eliminated if means is provided whereby some component of the depicted gear train may be disengaged from its cooperating or related component. More particularly, the second driving gear 29 can, as indicated in FIG. 3, be shifted along the second gear shaft 30 to disengage it from the second driven gear 31, whereby rotation of the axle 35 will rotate only third gear shaft 33, and whereby the aforementioned braking or loading effect felt by the person dragging or rolling the prime mover 2 will be substantially eliminated.

Figure 4:
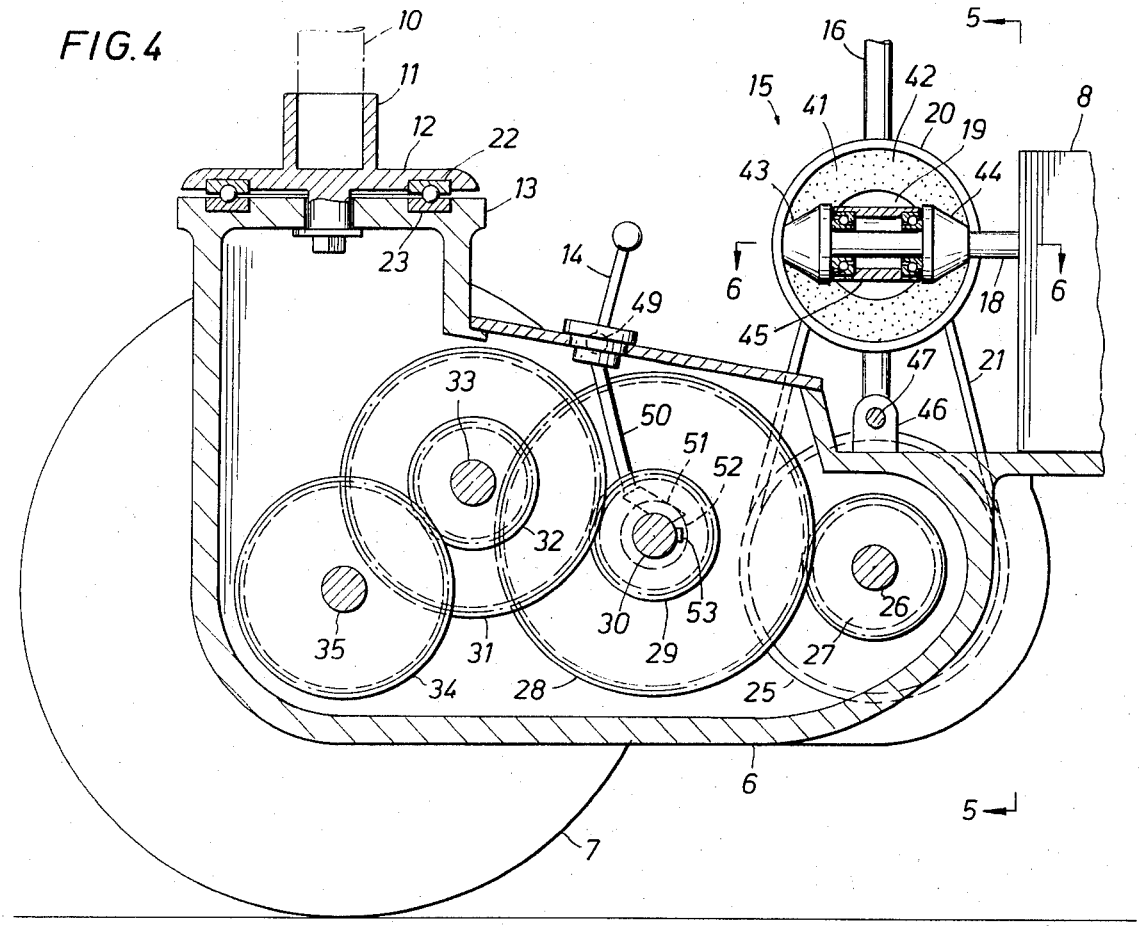
FIG. 4 is a pictorial representation, partly in cross section, of another different portion of the apparatus depicted in FIG. 2.

Referring now to FIG. 4, there may be seen a pictorial representation, partly in cross section, of the means by which the second driving gear 29 may be selectively engaged or disengaged from the second driven gear 31. In particular, and as also illustrated in FIG. 3, the second gear shaft 30 may be seen to be provided with a longitudinal slot or keyway containing a suitable key member 53 which engages the second driving gear 29 in a manner such that the gear 29 rotates with, but is laterally slidable on, the second gear shaft 30. In addition, there is provided a gear shift mechanism composed of a thrust arm 50 having a finger 51 at one end resting in a circular slot 52 in the collar poortion of the second driving gear 29, and having its upper end forming a ball joint 49 coupled to a shift handle 14. Accordingly, when the shift handle 14 is pivoted to one side or the other, the thrust arm 50 will cause its finger 51 to shift the second driving gear 29 along the shaft 30 in whichever direction is needed to disengage or reengage it with the second driven gear 31.

Figure 5:
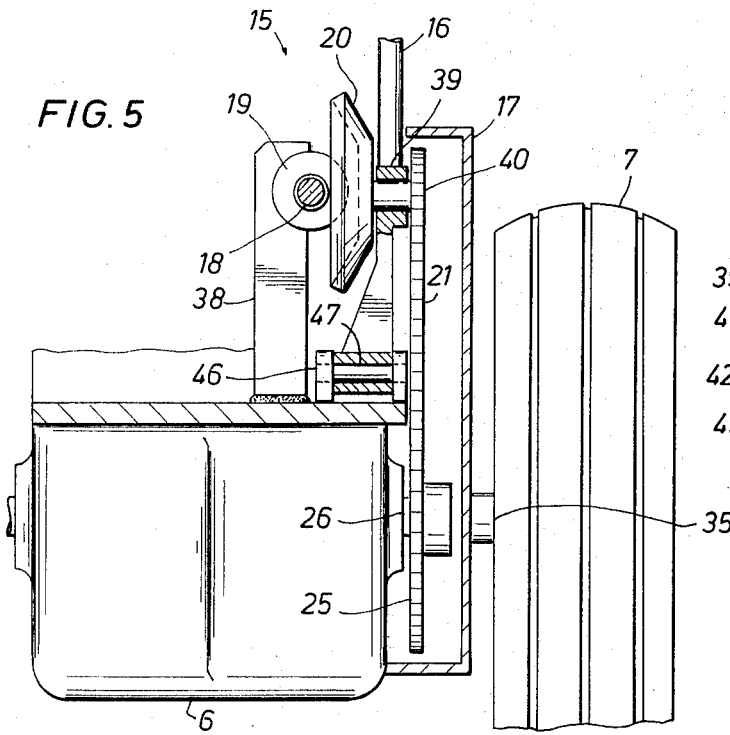
FIG. 5 is a pictorial representation, partly in cross section, of a portion of the apparatus depicted in FIG. 4.
Figure 6:
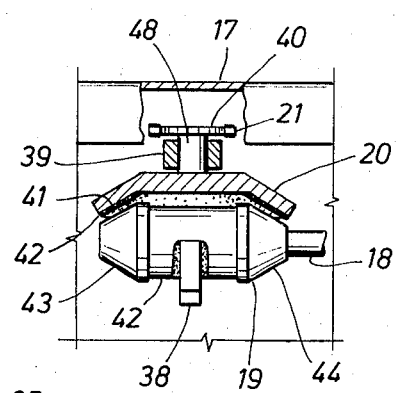
FIG. 6 is a pictorial representation, partly in cross section, of a portion of the aparatus depicted in FIGS. 4 and 5.

Referring now to FIGS. 4-6, there may be seen a more detailed pictorial representation of the clutch assembly 15 hereinbefore referred to, and wherein this component of the prime mover 2 is depicted as being primarily composed of a cylindrical driving member 19 fixed coaxially on the end of the drive shaft 18 of the engine 8, and a dish-like plate member 20 pivotally centered on a clutch bar 16 which, in turn, has its lower end pivotally attached to the chassis 6 by a clevis 46 and rocker pin assembly 47. The driving member 19 may further be seen as having oppositely bevelled ends 43 and 44, and further having a sleeve assembly 45 with ball bearings whereby it is freely rotatable about the cylindrical center portion of the driving member 19.

The plate member 20 has a concave-like face confronting the cylindrical driving member 19 with a circular bevelled surface 41, which angularly matches the cant of its bevelled ends 43 and 44, and which is preferably coated with a friction material 42 such as conventional brake lining or the like. It is significant that the diameter of the plate member 20, and of its bevelled inner surface 41, is sufficient that when the clutch bar 16 is positioned in a vertical arrangement, and whereby the plate member 20 is equidistantly arranged along the length of the cylindrical member 19, neither of its bevelled ends 43 and 44 will contact or engage the bevelled circular inner surface 41 of the plate member 20.

The engine 8 is preferably of a conventional design, and thus the drive shaft 18 will always revolve in one predetermined direction whenever the engine 8 is energized. However, the plate member 20 will rotate in one direction if the clutch bar 16 is tilted away from the engine 8, and the bevelled surface 41 is brought into frictional engagement with the bevelled end 44 of the cylindrical driving member 19, and in the opposite direction if the clutch bar 20 is tilted toward the engine 8 to bring the bevelled surface 41 into frictional engagement with the other bevelled end 43 of the driving member 19.

It will be noted that whenever the plate member 20 is brought into engagement with the driving member 19, this will tend to push the revolving driving member 19 out of alignment with the drive shaft 18 and this, in turn, tends to load the engine 8 in a disadvantageous manner. Accordingly, there is preferably provided a vertical support member 38 which opposes such misalignment by engaging the sleeve assembly 45 and, in turn, the cylindrical driving member 19.

Referring again to FIGS. 4-6, it may be seen that the plate member 20 is concentrically interconnected with an upper driving sprocket wheel 40 or the like by a shaft 48 which is rotatably disposed in a bearing 39 suitably mounted in or on the clutch bar 16. This upper sprocket wheel 40, in turn, is interconnected with the endless sprocket chain 21 which, in turn, is interconnected with lower driven sprocket wheel 25. Accordingly, rotation of the plate member 20 by the driving member 19 of the clutch assembly 15 will be transmitted directly through the gear train in the chassis 6 to the axle 35 and wheels 7.

As hereinbefore stated, the size and type of motivating means used as the engine 8 will depend largely on the size of the trailer 3 or other load sought to be moved, and thus is a function of the size of the various gears composing the gear train. Although a simple gasoline-driven unit is desirable for most purposes, it will be apparent that any type of conventional power supply may be employed in the present invention.

Referring again to FIGS. 1 and 2, it should be noted that the clutch assembly 15 hereinbefore described functions as a transmission as well as a clutch. In a particularly convenient arrangement, the drive shaft 18 may be revolved in a direction such that, when the clutch bar 16 is tilted forward from the engine 8, this will cause the driving member 20 to be rotated in a direction such that the prime mover 2 will be propelled ahead toward the trailer 3. Alternatively, when the clutch bar 16 is tilted backwards toward the engine 8, this will propel the prime mover backwards to pull the trailer 3 with it. Thus, when the clutch bar 16 is in a vertical or "neutral" position and the driven member 20 is disengaged from the driving member 19, power will be disconnected from the wheels 7 and the prime mover 2 will be capable of standing motionless while the engine 8 is still running.

The prime mover 2 may be provided with braking means of conventional design. It will be noted, however, that the clutch assembly 15 may also be used to retard or stop the prime mover 2 and trailer 3, as well as to connect power from the engine 8 to the axle 35 and wheels 7 of the apparatus.

Many other variations and modifications may be made in the apparatus and techniques hereinbefore described, both by those having experience in this technology, without departing from the concept of the present invention. Accordingly, it should be clearly understood that the apparatus and methods depicted in the accompanying drawings and referred to in the foregoing description are illustrative only and are not intended as limitations on the scope of the invention.

What is claimed is:

1. A self-propelled prime mover for mobilizing a towable vehicle having a draw bar and the like, comprising
   a rotatable axle means fixedly interconnecting two spaced-apart wheel members,
   chassis means supported at one end on said axle means and having a portion engageable with said vehicle and located above and between said wheel members,
   speed reduction means disposed in said chassis means and having a rotatable output drivably connected to said axle means and a rotatable input,
   engine means mounted on the other end of said chassis means from said engageable portion and having a mono-directionally rotatable drive shaft, and
   clutch means selectively interconnectable between said speed reduction means and said mono-directionally rotatable engine drive shaft for selectively and adjustably rotating said axle means bi-directionally at a selected velocity.

2. The prime mover described in claim 1, wherein said clutch means is further selectively interconnectable between said speed reduction means and said engine drive shaft to adjustably oppose rotation of said axle means.

3. The clutch means described in claim 2, comprising
   a rotary driving member revolvable by said engine drive shaft,
   a rotary driven member revolvable about an axis perpendicular to the rotation axis of said driving member,
   lever means for urging said driven member into engagement with said driving member at one location on said driven member for variably rotating said driven member in one direction and at another location thereon for variably rotating said driven member in the opposite direction, and
   power connecting means for rotatably interconnecting said driven member and said rotatable input of said speed reduction means.

4. The clutch means described in claim 3, wherein said driven member is pivotally mounted on and adjacent one end of said lever means and said lever means is pivotally attached at its other end to said chassis means.

5. The clutch means described in claim 4, wherein said driving member is aligned with and fixedly mounted on the end of said engine drive shaft, and wherein said lever member is arcuately movable to selectively bring said driven member into engagement with the revolving surface of said driving member at either of two diametrically opposite points on said driven member.

6. The clutch means described in claim 5, wherein said driving member comprises a cylindrical bar member axially fixed to and extending from the end of said engine driving shaft and having beveled and oppositely arranged ends, said beveled ends each being adapted for friction engagement with said revolving surface of said driven member at one of said two diametrically opposite points thereon.

7. The clutch means described in claim 6, wherein said driven member comprises a circular plate-like member pivotally centered on said lever means and having a recessed and beveled circular surface confronting and diametrically encompassing said beveled ends of said bar member, said power connecting means rotatably interconnecting said circular member with said rotatable input of said speed reduction means.

8. The clutch means described in claim 7, wherein the diameter of said recessed circular surface confronting and encompassing said ends of said bar member angularly matches said beveled ends of and has a diameter greater than the length of said cylindrical bar member, said lever means being arcuately movable to simultaneously bring said circular surface into friction engagement with one of said beveled ends and away from and out of engagement with the other of said beveled ends.

9. The clutch means described in claim 8, wherein said power connecting means comprises a sprocket wheel concentrically rotatable by and with said circular plate-like member, and an endless sprocket chain interconnecting said sprocket wheel and said rotatable input of said speed reduction means and rotatable in response to rotation of said circular plate-like member by said revolving cylindrical bar member.

10. The speed reduction means described in claim 9, further comprising means for engaging and disengaging said rotatable input and said axle means.

* * * * *